Feb. 26, 1963
L. F. ECKERT, JR
3,079,034
CLOSURE ASSEMBLY
Filed June 6, 1960
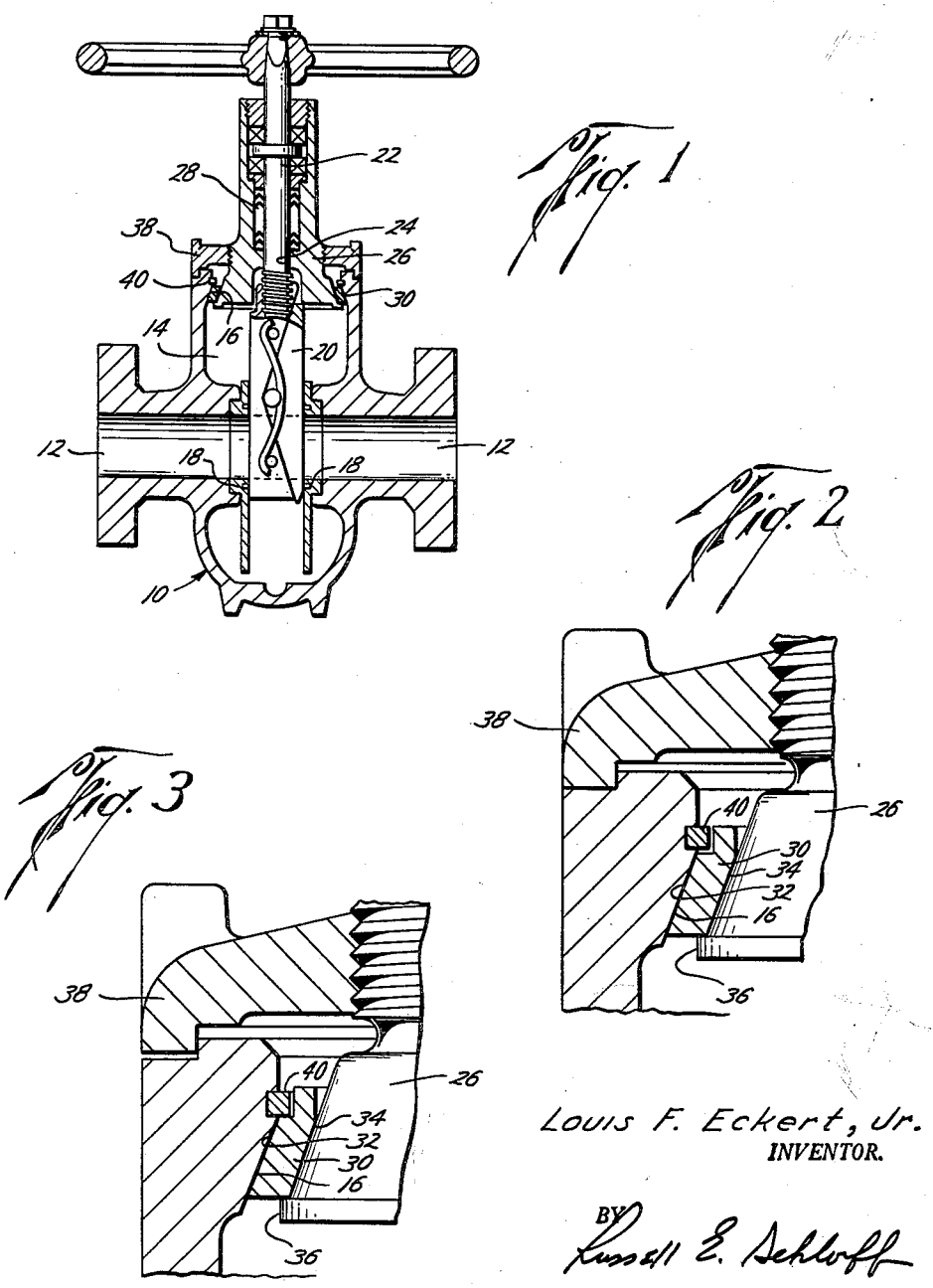
Louis F. Eckert, Jr.
INVENTOR.
BY Russell E. Schloff
ATTORNEY

United States Patent Office 3,079,034
Patented Feb. 26, 1963

3,079,034
CLOSURE ASSEMBLY
Louis F. Eckert, Jr., Houston, Tex., assignor to ACF Industries, Incorporated, New York, N.Y., a corporation of New Jersey
Filed June 6, 1960, Ser. No. 34,024
3 Claims. (Cl. 220—46)

This invention relates generally to a pressure actuated metallic seal ring closure assembly for pressure vessels in high pressure service.

Most valves have an open-ended valve chamber. The opening to this chamber is closed by a disengageable bonnet which permits entry into the chamber to make necessary repairs to the valve mechanism. Many other pressure vessels have similar openings when entrance into the interior must be available. While the most common method of sealing this opening has been to have a flanged bonnet bolted to the pressure vessel with suitable means between effecting a seal, such method is relatively expensive and time consuming to assemble and disassemble.

Another method, which has met with considerable success in the valve art, has been to provide a pressure vessel with a frusto conical opening having the surfaces convergingly tapered axially outward, utilizing a circular closure member having a similarly tapered peripheral surface and small enough to pass through the opening, and then inserting a metallic ring between the closure member and wall of the opening, which forms a seal between the closure member and wall of the opening and prevents the closure member from being pushed out. Since the internal pressure in the vessel exerts a force upon the closure member which tends to move the closure axially outward, the seal ring is sufficiently pliable to be forced into intimate contact with the closure member and wall of the opening to effect a seal of the opening. As the pressure increases, the closure member attempts to move further axially outward. The axially outward movement of the closure member is resisted by the wall of the opening. As the internal pressure increases the hoop stress of the wall surrounding the opening correspondingly increases due to the outward movement of the closure member and ring tending to expand the opening; therefore, the wall of the opening must be of a sufficient mass so as to resist expansion. While the pressure actuated sealing arrangement has the advantage of using the load multiplying effect of the angular surfaces to establish a seal with a small axial force, it has the disadvantage of requiring an extremely large mass to resist the outward movement of the closure member and has a tendency to build up unduly high hoop stresses as high axial loads are applied.

In order to take advantage of the multiplying effect of angular surfaces to form a tight seal with small axial loads and at the same time eliminate unduly high hoop stresses, the closure assembly of the present invention utilizes a pressure actuated seal ring construction to attain the seal, but restrains axial outward movement of the seal ring to thereby control the resultant hoop stress of the wall surrounding the opening. The pressure vessel of the present invention has an opening with an outwardly converging tapering wall. Positioned in the opening is a closure member having a similarly tapering wall. A seal ring is interposed between the closure member and wall of the pressure vessel. Axially outward of the closure member and ring there is provided a stop which will contact the closure member or seal ring to restrain axially outward movement of the closure member and ring before any excess hoop stress is reached. The stop is so positioned that the ring can move out a controlled amount to effect a seal; however, axially outward movement past this point is restrained by the stop which prohibits the buildup of excessive hoop stress. By restraining the axially outward movement, most of the load thereafter created by internal pressure acting on the closure member is taken by the stop and the rate of increase in hoop stress is markedly reduced. This load on the stop is not multiplied by any wedging action and therefore can be controlled with a smaller mass.

It is an object of the present invention to provide a pressure actuated metallic seal ring closure assembly in which hoop stresses are maintained at a minimum.

It is another object to provide a pressure actuated closure assembly in which the axially outward movement of the closure member is controlled.

It is a further object to provide a pressure actuated closure assembly in which after a controlled amount of axially outward movement of the closure member, the closure member contacts a stop which restrains any further axially outward movement, thus controlling hoop stress.

It is a further object to provide a pressure actuated closure assembly in which the mass of the outer wall of the pressure vessel can be maintained at a minimum.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a vertical cross sectional view of a valve equipped with the closure assembly of the present invention.

FIG. 2 is an enlarged sectional view of a portion of the closure assembly in assembled condition.

FIG. 3 is a view similar to FIG. 2 showing the restraint of the sealing ring.

While the closure assembly is shown incorporated in a valve, it can be readily seen that the closure assembly of the present invention can be utilized as a closure assembly for an opening in any type of pressure vessel. The term pressure vessel employed herein is intended to include any structure of whatever description capable of retaining substance under pressure which is provided with an opening to furnish access to the interior thereof. The invention relates to a means for effecting the closure of the opening of such a vessel and not specifically to the nature or purpose of the vessel.

Referring now to the drawings, there is a valve housing 10, which is in effect a pressure vessel, having a flow passage 12 therethrough which is interrupted by a valve chamber 14 having a frusto conical opening 16. Valve seats 18—18 are arranged in the flow passage at each side of the chamber 12 to provide seating surfaces for a gate member 20. A valve stem 22 is attached to the gate member 20 to provide reciprocatory movement. The stem 22 extends outwardly of the valve chamber 14 through a passage 24 in a bonnet or closure member 26 positioned in the opening 16. Leakage between the stem 22 and passage 24 is prevented by a stuffing box 28. As will be explained subsequently, the space between the bonnet 26 and the wall of the opening 16 is closed by a seal ring 30.

The peripheral surface of the wall 32 defining the frusto conical opening 16 taperingly converges axially outward of the housing. The closure member 26 has a similar outwardly tapering surface 34. These surfaces 32—34 are parallel, as shown in the drawings. If desired, the surfaces 32—34 can converge in respect to each other as taught by the Laurent United States Patents 2,582,995, 2,582,996 and 2,582,997; however, by using the closure assembly of the present invention it is not necessary to employ the tapered wedge ring to retain the closure member in the opening. The seal ring 30 has inner and outer surfaces corresponding to the surfaces 32—34. If desired, the closure member 26 may be provided with a shoulder 36 adjacent its inner axial end abutting the inside portion of the inner axial end face of the seal ring 30 to insure stability of the seal ring 30 in reference to the closure member 26. To obtain the initial seal of said closure assembly, there is a clamp ring 38 which engages the bonnet 26 and top of the body and allows the bonnet 26 to pull axially outward thus engaging the seal ring 30 with the surface 34 of the bonnet and surface 32 of the opening.

With such construction, as the internal body pressure increases the closure member 26 tends to move axially outward. Such movement forces the inner and outer surfaces of the seal ring 30 into intimate contact with the surfaces 32—34 of the housing and closure member forming a tight metal-to-metal seal. In order to prevent more axial movement than is necessary to establish a tight seal, previous assemblies reinforced the wall adjacent to the opening by utilizing a considerable mass of material. In order to cut down on the size of the wall and to limit the amount of hoop stress to which the wall is subject, the present invention has a stop 40 incorporated in the opening 16 axially outward of the seal ring 30. This stop 40 may be formed, as shown in the drawing, by a snap type ring inserted in a groove machined in the wall of the opening or may be integral with the body. The stop 38 is positioned axially outward of the seal ring 30 so that the seal ring can move sufficiently so that a tight metal-to-metal seal is formed between the closure member-seal ring-wall, see FIG. 2. However, to prevent undue hoop stress, the stop 40 will restrain axial outward movement of the seal ring 30 beyond a set amount. One method is to position the stop 40 so that the seal ring 30 will be arrested when a pressure approaching the test pressure for the pressure vessel is reached.

In a 5000# working pressure, 10,000# test pressure valve having a closure with a 5¼" opening, it was found that by having a 1/32" setoff between the seal ring and stop, that the seal ring reached the stop at approximately 10,000# p.s.i. internal pressure.

An actual test was set up to compare the hoop stress obtained with a closure assembly without a stop and an identical closure assembly except for the inclusion of a stop. With the assembly having the stop, the ring made contact with the stop at approximately 10,000 p.s.i. internal pressure. Up until the time the assembly with stop contacted the stop, the hoop stress of both assemblies was approximately the same. After contact, the hoop stress of the assembly with the stop increased at a much slower rate than before, whereas the hoop stress of the assembly without stop continued at the same rate. At 10,000 p.s.i. internal pressure, the resultant hoop stress in both assemblies was approximately 27,000 p.s.i. Application of internal pressure was continued until a hoop stress of 48,000 p.s.i. was reached in each assembly. The assembly without the stop reached this point with the additional application of 6000 p.s.i. internal pressure, whereas it took an additional 15,000 p.s.i. internal pressure in the assembly with the stop to reach this point. As can be seen from the above, the rate of increase of hoop stress in a closure assembly having a stop is markedly decreased when the seal ring makes contact with the stop. Therefore, if the closure assembly having a stop is used in a pressure vessel having a wall around the opening of the same mass as that of a closure assembly which does not have a stop, the safety factor is greatly increased. It can also be seen that the mass of the wall surrounding the opening can be considerably decreased while at the same time retaining the accepted safety factor for pressure vessels.

The reason that hoop stress is not static after the ring has reached the stop is that the ring of necessity is made soft enough so that it can be mashed against its mating surfaces to obtain an initial seal and therefore yields slightly on contacting and loading upon the stop ring, thus allowing slight additional axial outward movement of the closure member with a resultant increase in hoop stress of the wall.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. A closure assembly for an opening in a pressure vessel comprising: a pressure vessel, a frusto conical opening in said vessel, the peripheral surface of the wall defining the frusto conical opening taperingly converging outwardly of the vessel, a closure member for said opening, the closure member being circular in plan and having an outwardly converging tapered surface commencing at the inner axial end of the closure member, the maximum diameter of said closure member being less than the minimum diameter of said frusto conical opening, whereby the closure member may be inserted through the frusto conical opening, the peripheral wall surface of said frusto conical opening being spaced apart from the tapered surface of said closure member when the closure member is in operative position providing a space therebetween, a metallic annular seal ring interposed between said closure member and the wall of said opening, said ring forming a seal between said closure member and said opening, an annular groove in said wall of said opening axially outward of said seal ring, a stop ring positioned in said groove and extending into the opening to restrain axially outward movement of said ring, said stop ring positioned sufficiently distant from the point of initial assembly so as to permit sufficient axial outward movement to form a seal but restraining further axially outward movement to decrease the rate of increase of hoop stress of the wall surrounding the opening.

2. A closure assembly for an opening in a pressure vessel comprising: a pressure vessel, a frusto conical opening in said vessel, the peripheral surface of the wall defining the frusto conical opening taperingly converging outwardly of the vessel, a closure member for said opening, the closure member being circular in plan and having an outwardly converging tapered surface commencing at the inner axial end of the closure member, the maximum diameter of said closure member being less than the minimum diameter of said frusto conical opening, whereby the closure member may be inserted through the frusto conical opening, the peripheral wall surface of said frusto conical opening being spaced apart from the tapered surface of said closure member when the closure member is in operative position providing a space therebetween, a metallic annular seal ring interposed between said closure member and the wall of said opening, said ring forming a seal between said closure member and said opening, a stop in said opening axially outward of said seal ring extending into the opening to restrain axially outward movement of said ring, said stop ring positioned sufficiently distant from the point of initial assembly so as to permit sufficient axial outward movement to form a seal but restraining further axially outward movement to decrease the rate of increase of hoop stress of the wall surrounding the opening.

3. A gate valve comprising a housing having an open ended chamber, an axially outwardly converging tapered surface forming the opening of said chamber, the axial outer end of the surface being of a smaller diameter than is the axial inner end, a bonnet for said opening insertable through said opening, an outwardly tapered peripheral face on said bonnet of a lesser taper relative to the axis of the opening than the taper of the wall forming the opening, a seal between said bonnet surface and the surface of said opening comprising a metallic seal ring having peripheral surfaces mating with the tapered surface of the opening and tapered peripheral face of the bonnet, a clamp ring engaging said body and bonnet to pull the bonnet and ring into said opening to form a seal for said opening, an annular groove in the surface of said opening spaced axially outward of said seal ring, a stop ring positioned in said groove and extending into said opening to limit the axial outward movement of said seal ring, said stop ring positioned sufficiently distant from the point of initial assembly so as to permit sufficient axial outward movement of said bonnet to form a seal but restraining further axially outward movement to decrease the rate of increase of hoop stress of the wall surrounding the opening.

References Cited in the file of this patent

UNITED STATES PATENTS

| | | |
|---|---|---|
| 2,582,995 | Laurent | Jan. 22, 1952 |
| 2,582,996 | Laurent | Jan. 22, 1952 |
| 2,582,997 | Laurent | Jan. 22, 1952 |
| 2,617,554 | Smith | Nov. 11, 1952 |

FOREIGN PATENTS

| | | |
|---|---|---|
| 130,397 | Germany | Apr. 30, 1902 |